US008644439B2

(12) United States Patent
Gupta

(10) Patent No.: US 8,644,439 B2
(45) Date of Patent: Feb. 4, 2014

(54) CIRCUITS AND METHODS FOR SIGNAL TRANSFER BETWEEN DIFFERENT CLOCK DOMAINS

(75) Inventor: Chirag Sureshchandra Gupta, Ahmedabad (IN)

(73) Assignee: Texas Instruments Incorporated, Dallas, TX (US)

( * ) Notice: Subject to any disclaimer, the term of this patent is extended or adjusted under 35 U.S.C. 154(b) by 308 days.

(21) Appl. No.: 13/209,682

(22) Filed: Aug. 15, 2011

(65) Prior Publication Data

US 2013/0043915 A1 Feb. 21, 2013

(51) Int. Cl.
*H04L 7/00* (2006.01)

(52) U.S. Cl.
USPC ...... 375/354; 375/355; 370/324; 370/395.62; 713/400; 713/375

(58) Field of Classification Search
USPC ..................... 375/354, 355; 370/324, 395.62; 713/400, 375
See application file for complete search history.

(56) References Cited

U.S. PATENT DOCUMENTS

| | | | | |
|---|---|---|---|---|
| 6,084,934 | A * | 7/2000 | Garcia et al. | 375/370 |
| 2007/0244685 | A1 * | 10/2007 | Ja et al. | 703/15 |
| 2009/0204933 | A1 * | 8/2009 | Rezgui | 716/10 |
| 2009/0244993 | A1 * | 10/2009 | Udell et al. | 365/193 |

* cited by examiner

*Primary Examiner* — Leila Malek
(74) *Attorney, Agent, or Firm* — John R. Pessetto; Wade J. Brady, III; Frederick J. Telecky, Jr.

(57) ABSTRACT

In certain embodiments, a circuit for transferring signals from a source clock domain to a destination clock domain comprises a first pulse generation circuit, a hold flip-flop circuit, a clocked synchronizer circuit and a second pulse generation circuit. The first pulse generation circuit, operable in the source clock domain, generates a source data pulse from a source data signal. The hold flip-flop circuit, operable in the source clock domain, is configured to hold the source data pulse. The clocked synchronizer circuit, operable in the destination clock domain, samples the source data pulse received from the hold flip-flop circuit, where source data pulse held at the output of the hold flip-flop circuit is cleared when the source data pulse is sampled by the clocked synchronizer circuit. The second pulse generation circuit, operable in the destination clock domain, is configured to generate a destination data pulse from the sampled source data pulse.

20 Claims, 5 Drawing Sheets

600

602 — GENERATE A SOURCE DATA PULSE FROM A SOURCE DATA SIGNAL IN A SOURCE CLOCK DOMAIN

604 — LATCH THE SOURCE DATA PULSE AT AN OUTPUT OF A SEQUENTIAL BLOCK IN THE SOURCE CLOCK DOMAIN

606 — SAMPLE THE SOURCE DATA PULSE RECEIVED FROM AN OUTPUT OF SEQUENTIAL BLOCK BY A SYNCHRONIZATION CIRCUIT IN A DESTINATION CLOCK DOMAIN

608 — GENERATE A DESTINATION DATA PULSE FROM THE SAMPLED SOURCE DATA PULSE RECEIVED FROM AN OUTPUT OF THE SYNCHRONIZATION CIRCUIT IN THE DESTINATION CLOCK DOMAIN

610 — CLEAR THE OUTPUT OF THE SEQUENTIAL BLOCK UPON SAMPLING OF THE SOURCE DATA PULSE BY THE SYNCHRONIZER CIRCUIT

200
DOUT
246
240
244
242
R
CLRZ
Q
F4
D
CLK
C
230
CLRZ
Q
F3
D
CLK
234
Q
252
232
CLRZ
Q
F2
D
CLK
P
254
222
CLRZ
Q
F1
D
CLK
A
224
220
B
216
214
212
CLRZ
Q
FP
D
CLK
210
RESET_CLK2_DOMAIN
RESET_CLK1_DOMAIN
DIN
CLK1
CLK2

500
510
FIRST CLOCK DOMAIN
520
SECOND CLOCK DOMAIN
200
210
212
214
216
220
222
224
230
232
234
240
242
244
246
252
254
RESET_CLK2_DOMAIN
RESET_CLK1_DOMAIN
DIN
DOUT
CLK1
CLK2
CLRZ
D
Q
CLK
FP
F1
F2
F3
F4
A
B
P
Q
C
R

CIRCUITS AND METHODS FOR SIGNAL TRANSFER BETWEEN DIFFERENT CLOCK DOMAINS

TECHNICAL FIELD

The present disclosure generally relates to signal transfer between different clock domains in a system on chip (SoC).

BACKGROUND

Digital or mixed signal circuits may have multiple clock domains operating on different clock frequencies. Specifically, multiple independent clocks are common in system-on-chip (SoC) design, as a majority of SoC devices have multiple interfaces use different clock frequencies. It is often required to transfer signals from one clock domain to another clock domain in these designs. To accomplish the successful signal transfer across two clock domains, designers need to instantiate synchronizing circuit and/or signal stretcher circuit based on relationships between clock frequencies of the clock domains. If signals are not synchronized across two different clock domains, the result may be metastability in design or data loss.

SUMMARY

Circuits and methods for transferring signals from a source clock domain to a destination clock domain are disclosed. In one embodiment, a disclosed signal transfer circuit comprises a first pulse generation circuit, a hold flip-flop circuit, a clocked synchronizer circuit and a second pulse generation circuit. The first pulse generation circuit, operable in the source clock domain, generates a source data pulse from a source data signal. The hold flip-flop circuit, operable in the source clock domain, is configured to hold the source data pulse at an output of the hold flip-flop circuit. The clocked synchronizer circuit, operable in the destination clock domain, is configured to sample the source data pulse received from the hold flip-flop circuit in the destination clock domain. The output of the hold flip-flop circuit (the source data pulse) is cleared when the source data pulse is sampled by the clocked synchronizer circuit. A second pulse generation circuit, operable in the destination clock domain, is configured to generate a destination data pulse in the destination clock domain.

DETAILED DESCRIPTION

In an exemplary scenario, signal transfer circuits between different clock domains may include a double or multi flop synchronizer for transfer of signals from a slow clock domain to a fast clock domain and a signal stretcher circuit for transfer of signals from the fast clock domain to the slow clock domain. A double or multi flop synchronizer may include providing two or multiple flip-flops in the fast clock domain that synchronizes a data input received from the slow clock domain in the fast clock domain.

Figure 1:
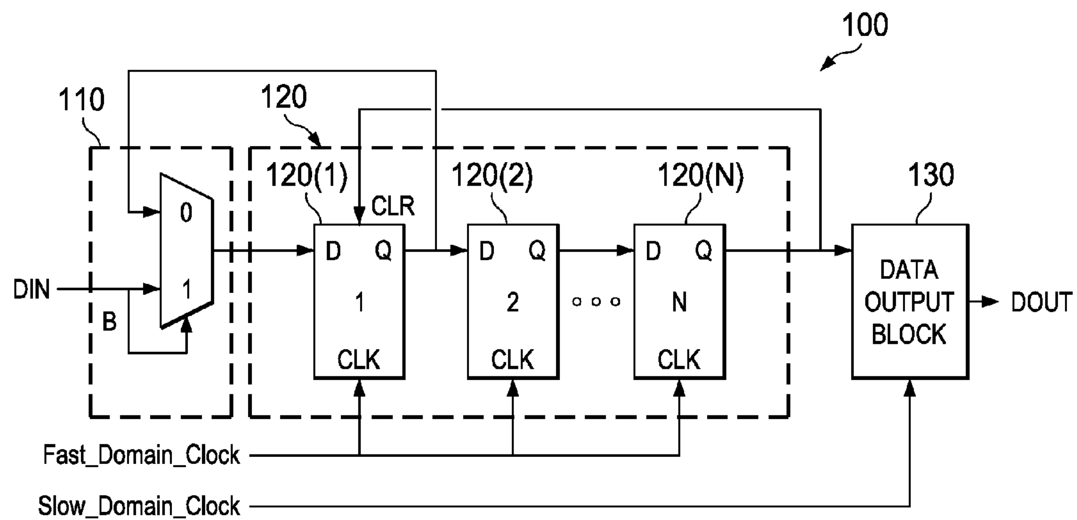
FIG. 1 illustrates a circuit for transferring a signal from a fast clock domain to a slow clock domain according to an exemplary scenario.

An exemplary signal stretcher circuit is depicted in FIG. 1. As depicted in FIG. 1, a signal stretcher circuit 100 includes a data input block 110, a synchronizer block 120 including a plurality of serially connected sequential elements 120(1)-120(N) and a data output block 130. The data input block 110 provides the data input (see, Din) to the serially connected sequential elements 120(1)-120(N). The sequential elements 120(1)-120(N) hold the data input in the fast clock domain for N cycles. As such, the Din is sampled at output of the sequential element 120(N) in N clock cycles of the Fast_Domain_Clock. N may be calculated as the ratio of a clock frequency of the fast clock domain (shown as, Fast_Domain_Clock) to a clock frequency of the slow clock domain (shown as, Slow_Domain_Clock). After the N clock cycles of the Fast_Domain_Clock, the output of the sequential element 120(N) is sampled by the data output block 130 in the slow clock domain. Accordingly, the data input (DIN in the fast clock domain) may be received as Dout in the slow clock domain.

When using the signal stretcher circuit 100, a worst case ratio N of the fast clock frequency to the slow clock frequency should be known for a reliable signal transfer. Further, one extra clock cycle may be added to N to address any phase difference between the two clock domains. In an SoC, for different application scenarios, frequencies of the source clock domain and the destination clock domain may change and so the ratio N also changes. Thus, a designer needs to go through all the application scenarios and needs to calculate worst case clock ratio and instantiate the signal-stretcher for that many cycles, which may be tedious exercise in complex SoCs where multiple clocks have different ratios in different applications. Further adding a signal stretcher circuit for the worst case ratio results in an unwanted delay in propagation of the Din, if for an actual application the required ratio is lower than the worst case ratio.

Various embodiments of the present technology provide solutions for transferring data signals from a source clock domain to a destination clock domain that overcome the above and other limitations, in addition to providing currently unavailable benefits. For instance, various embodiments provide solutions for the signal transfer from the source clock domain to the destination clock domain in a seamless manner, irrespective of the ratio of the clock frequencies between the source and destination clock domains and the phase difference. Further, various embodiments of the present technology provide circuits that are metastability hardened so that signal transfer is reliable across various nodes of the circuits. Various embodiments of the present technology provide circuits and methods that can work for signal transfer from a slow frequency domain to a fast frequency domain or vice versa. Various embodiments of the present technology are herein disclosed in conjunction with FIGS. 2 to 6.

Figure 2:
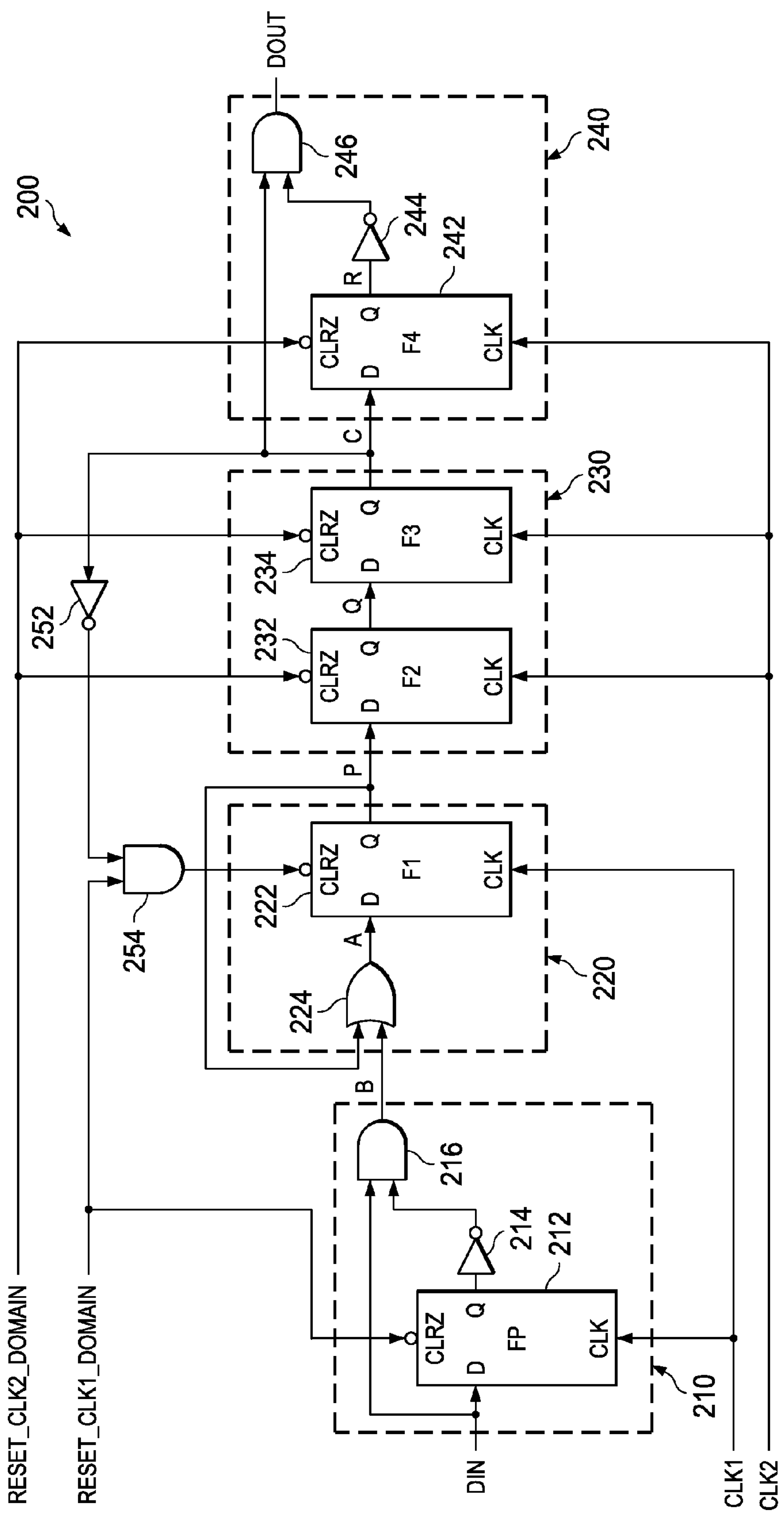
FIG. 2 illustrates a signal transfer circuit for transferring signals from a source clock domain to a destination clock domain according to an embodiment.

FIG. 2 illustrates a signal transfer circuit 200 for transferring signals between different clock domains according to an embodiment. As depicted, the circuit 200 is logically divided in four parts: a first pulse generation circuit 210, a hold flip-flop circuit 220, a clocked synchronizer circuit 230 and a second pulse generation circuit 240. The circuit 200 can be coupled between two clock domains (for example, a source clock domain and a destination clock domain) for transferring signals therebetween. Herein, transfer of a signal, such as a source data signal (shown as, Din) from the source clock domain (not shown in FIG. 1) to the destination clock domain (not shown in FIG. 1), is explained in conjunction with the exemplary embodiment of the signal transfer circuit 200 shown in FIG. 2. Herein, clock signal of the source clock domain is represented as CLK1 and a clock signal of the destination clock domain is represented as CLK2.

First pulse generation circuit 210 operates in the source clock domain and is configured to generate a source data pulse from the source data signal (DIN). First pulse generation circuit 210 may include a sequential element such as a D flip-flop 212, an inverter 214 connected at output (Q) of the flip-flop 212 and a logic gate such as an AND gate 216. The flip-flop 212 has a clock input (see, CLK) that receives source clock (CLK1).

The inverter 214 is connected to the output of the flip-flop 212 and output of the inverter 214 is fed to one input of the AND gate 216. As depicted, the AND gate 216 receives Din and the inverted output of the flip-flop 212 at its input. In the exemplary embodiment shown in FIG. 2, output of the AND gate 208 (node B) follows an active high input of the Din, and the signal at node B represents a pulse of the Din. Where the Din is an active low input, the Din is converted into the active high input before feeding to the flip-flop 212 and the AND gate 216. For instance, an inverter (not shown) may be selectively added in path of the Din and the inverted Din may be provided to the flip-flop 212 and the AND gate 216 in cases where the Din is the active low signal.

Elements such as multiplexers or encoders may be used to selectively provide the Din or the inverted Din to the flip-flop 212 and the AND gate 216. As such, the first pulse generation circuit 210 may include any device or set of devices known in the art to enable generating the source data pulse from the source data signal in the source clock domain. For instance, first pulse generation circuit 210 may also be embodied as alone or in combination of a number of sequential and/or combinational elements, such as various types of flip-flops and/or latches and logical gates such as AND gates, OR gates, NAND gates and NOR gates.

Hold flip-flop circuit 220 operates in the source clock domain and is configured to hold the source data pulse received from first pulse generation circuit 210, at an output of hold flip-flop circuit 220. Hold flip-flop circuit 220 includes a hold flip-flop such as D flip-flop 222 and a logic gate such as an OR gate 224. Flip-flop 222 operates with the source clock (CLK1) as its clock input (see, CLK) is connected to the CLK1.

As depicted, OR gate 224 has inputs including output of the pulse generation circuit 210 (e.g., source data pulse) and output of flip-flop 222. An output of OR gate 224 is coupled with a data input (see, D) of flip-flop 222. Flip-flop 222 switches with the first clock signal (CLK1), as clock input of the flip-flop 222 (CLK) is shown as connected to the CLK1. Hold flip-flop circuit 220 holds/latches the active high pulse (present at node B) at an output (see, node P) of flip-flop 222. As such, in the embodiment shown in FIG. 2, the active high pulse of node B, once captured by flip-flop 222, is maintained at node P, unless the output of flip-flop 222 is reset or cleared. In an exemplary embodiment, clear input (see, CLRZ) of flip-flop 222 may be utilized to clear the output of flip-flop 222. The clear input is connected to an output of clocked synchronizer circuit 230.

Hold flip-flop circuit 220 may include any device or set of devices known in the art to enable latching/holding the source data pulse (for instance, the active high signal) unless a clear or reset input is not asserted. For instance, hold flip-flop circuit 220 may also be embodied as alone or in combination of a number of sequential and/or combinational elements, such as various types of flip-flops and/or latches and logical gates such as AND gates, OR gates, NAND gates and NOR gates.

With reference still to the exemplary embodiment shown in FIG. 2, the output of hold flip-flop circuit 220 is fed to clocked synchronizer circuit 230. Clocked synchronizer circuit 230 operates in the destination clock domain, and is configured to sample the source data pulse received from hold flip-flop circuit 220.

Synchronizer circuit 230 includes a first flip-flop 232 and a second flip-flop 334. Flip-flops 332 and 334 operate in the destination clock domain (shown as, CLK2 signal connected to CLK inputs of the flip-flops 332 and 334). Flip-flops 332 and 334 are serially connected D flip-flops. Flip-flops 332 and 334 sample the active high signal of the source data pulse in two clock cycles of CLK2 at the output of flip-flop 334 (shown as, node C). As node C transitions to the active high state (e.g., when the active high state of the source data pulse is sampled by the clocked synchronizer circuit 230), clear input (CLRZ) of hold flip-flop 222 is asserted and the output of hold flip-flop 222 (e.g., node P) is made clear. As such, it should be understood that when CLRZ of flip-flop 222 is asserted, the source data pulse is already captured by flip-flop 232 of clocked synchronizer circuit 230.

A source data pulse sampled in the destination clock domain at the output of clocked synchronizer circuit 230 may be utilized to generate a destination data pulse that may be analogous to the source data pulse of the source clock domain. In the exemplary embodiment of FIG. 2, a sampled source data pulse is provided to second pulse generation circuit 240. Second pulse generation circuit 240 generates the destination data pulse that may be utilized in the destination clock domain.

Second pulse generation circuit 240 includes a D flip-flop 242, an inverter 244 connected to an output of D flip-flop 242, and an AND gate 246. AND gate 246 performs a logical AND operation of the output of inverter 244 and the output of clocked synchronizer circuit 230. Destination pulse generation circuit 240 shown in FIG. 2 is for generating the destination data pulse (at node Dout) for the source data pulse, where the corresponding source data signal is the active high signal. Where the source data signal is the active low signal, an inverted output (inverted logic of node Dout) may be taken as the destination data pulse. An inverter (not shown) may be selectively added at the output of AND gate 246 in cases where Din is the active low signal.

In some embodiments, elements such as multiplexers or encoders may be used to selectively provide Dout or inverted Dout for use in the destination clock domain. As such, second pulse generation circuit 240 may include any device or set of devices configured to enable a generation of the destination data pulse from the sampled source data pulse at the output of clocked synchronizer circuit 230. For instance, second pulse generation circuit 240 may also be embodied as alone or in combination of a number of different sequential and/or combinational elements, such as various types of flip-flops and/or latches and logical gates such as AND gates, OR gates, NAND gates and NOR gates.

In certain embodiments, various flip-flops of signal transfer circuit 200 may be connected to suitable reset/clear circuits. For instance, the flip-flops that are clocked in the source clock domain, such as flip-flops 212 and 222, may have their reset/clear inputs connected to a source clock reset signal (shown as, RESET_CLK1_DOMAIN), and the flip-flops that are clocked in the destination clock domain, such as flip-flops 232, 234 and 242, may have their reset/clear inputs connected to a destination clock reset signal (shown as, RESET_CLK2_DOMAIN). In certain embodiments, the clear input (CLRZ) of flip-flop 222 may be connected to the output of clocked synchronizer circuit 230 and the source clock reset signal. For example, signal transfer circuit 200 may additionally include an inverter 252 and an AND gate 254. As depicted in FIG. 2, inverted output of flip-flop 234 (through the inverter 252) may be connected to the AND gate 254 that also receives the source clock reset signal as input. As the active high signal of the source data pulse is captured at the output of flip-flop 234, the CLRZ is asserted and the output of flip-flop 222 is cleared.

Figure 3:
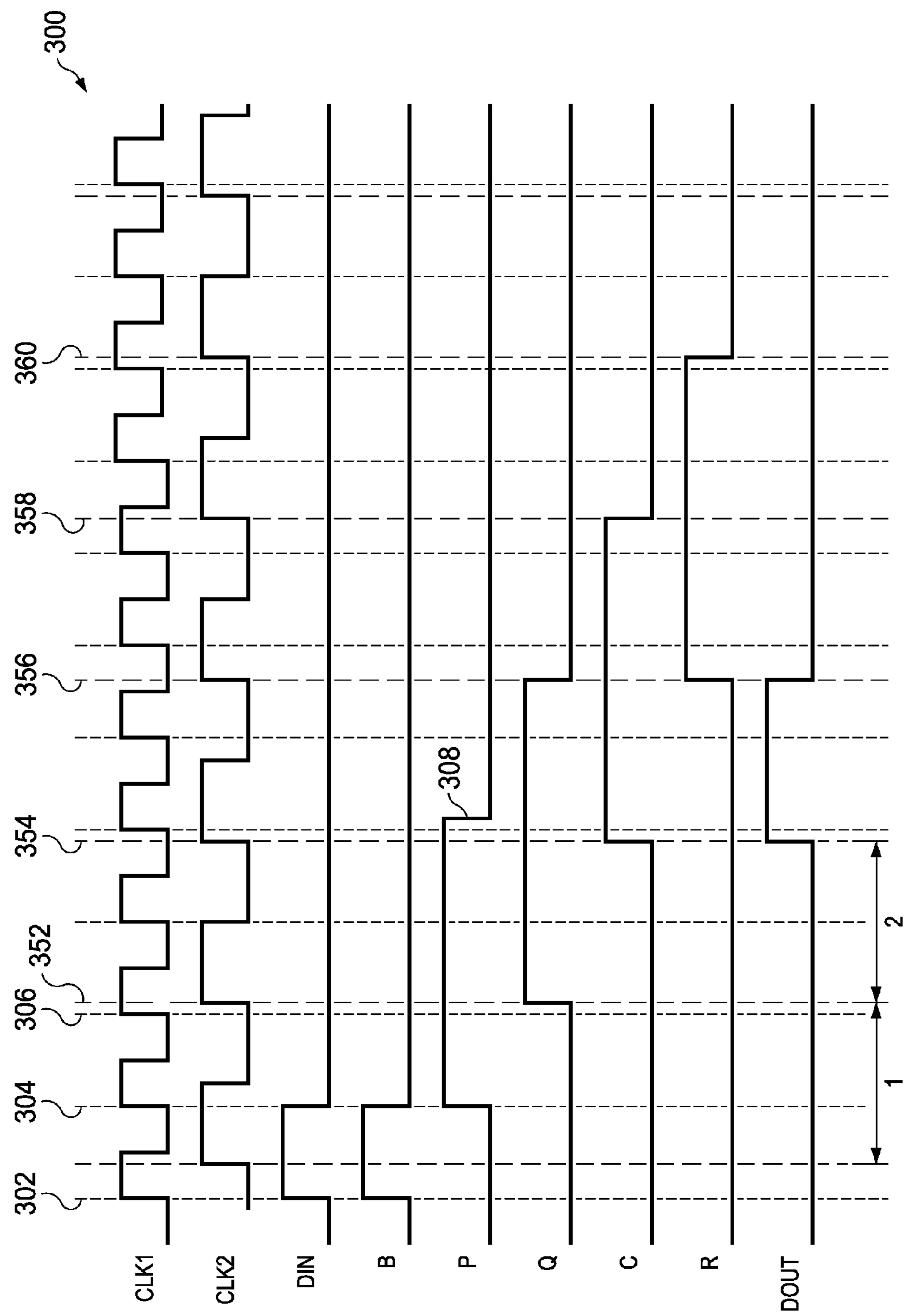
FIG. 3 is a timing diagram illustrating signals at various nodes of the signal transfer circuit of FIG. 2, while transferring signals from a fast clock domain to a slow clock domain according to an embodiment.
Figure 4:
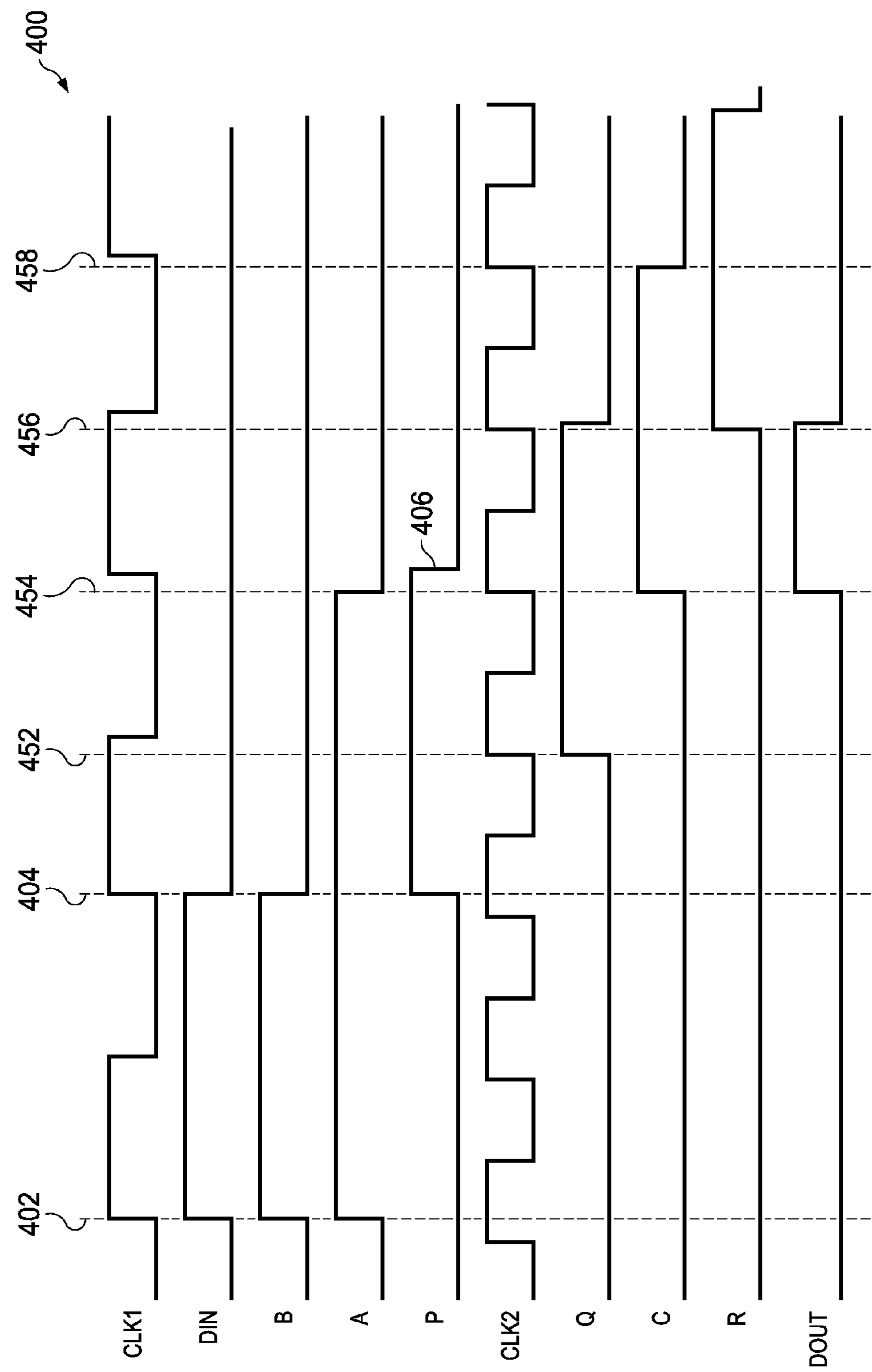
FIG. 4 is a timing diagram illustrating signals at various nodes of the signal transfer circuit of FIG. 2, while transferring signals from a slow clock domain to a fast clock domain according to an embodiment.

Now consider the functioning of signal transfer circuit 200 circuit of FIG. 2 with reference to the timing diagrams of FIGS. 3 and 4, bearing in mind that the time relationships between the various waveforms shown in FIGS. 3 and 4 are only indicative, because not all of the delays associated with the various elements of the circuit have been taken into consideration in a rigorous manner.

FIG. 3 is a timing diagram 300 depicting the details of signals at various nodes of signal transfer circuit 200, when the source clock domain operates at a fast clock frequency and the destination clock domain operates at a slow clock frequency. As depicted in timing diagram 300 of FIG. 3, the CLK1 and the CLK2 are asynchronous clocks, the CLK1 represents a fast clock signal and CLK2 represents a slow clock signal. Various indicative transitions of signals at various nodes of the signal transfer circuit 200 are herein explained at multiple clock instances.

At 302: As depicted in timing diagram 300, at the rising edge of CLK1 (see, instance 302), node B follows the source data signal (DIN). In the timing diagram 300, source data signal (DIN) is assumed as an active high input (e.g., logic '1'). As Din changes from logic '0' to logic '1' at instance 302, output of AND gate 216 (node B) achieves the logic '1' state, as other input of AND gate 216 is logic '1' since the output of flip-flop 212 is at logic '0'. It should be contemplated that as the inverted output of the flip-flop 212 is logic '1', which insures that node B follows the logic level of the Din. In this example, at instance 302, logic levels at nodes P, Q, C and R are logic '0'. As such, it should be understood that the signal at node B represents a source data pulse that follows the source data signal (DIN).

At 304: At the next rising edge of CLK1, (e.g., at the instance 304), output of hold flip-flop circuit 220 follows the signal at node A. For instance, flip-flop 222 switches to logic '1' as the logic value at node A is '1' due to the logic '1' present at node B. Further, as shown in FIG. 3, as the source data signal (DIN) changes to logic '0' from logic '1', the output of flip-flop 212 transitions to logic '1', and its inverted output (e.g., logic '0') is propagated at node B, causing the logic level of node B to logic '0'. It is noted that the signal at node B is the clocked pulse of the source data signal (DIN). For example, the signal at node B is an active high pulse for the active high input of the Din. At the instance 304, logic levels at nodes Q, C and R are at '0'.

At 306: At the next rising edge of CLK1 (e.g., at the instance 306), the output of the hold flip-flop circuit 220 (e.g., node B) remains at logic '1', as the previous output of the hold flip-flop circuit 220 (e.g., logic '1') is feedback to the D input of flip-flop 222 via OR gate 224. As a result, the signal at node B remains at logic '1', unless hold flip-flop circuit 220 is cleared or reset.

At 352: At the rising edge of CLK2 (e.g., at instance 352), the value at node B that is received at an input of clocked synchronizer circuit 230, is sampled in the destination clock domain. For instance, the output (Q) of flip-flop 232 switches to a logic '1' state, at the instance 352. At instance 352, logic levels at nodes C and R are at logic '0'.

At 354: At the next rising edge of CLK2 (e.g., at instance 354), the output of flip-flop 232 is sampled at the output of flip-flop 234. As a result, output of clocked synchronizer circuit 230 (node C) switches to logic '1' from logic '0', causing the output of second pulse generation circuit 240 (shown as, Dout) to attain a logic '1' state. Further, as the value at node C switches to logic '1', it asserts the clear input (e.g., CLRZ) of flip-flop 222 of hold flip-flop circuit 220, causing node P to attain a logic '0' level. Such switching at node P (output (Q) of the flip-flop 222) is shown by the reference numeral 308. As such, it is noted that there may be a combinational delay in clearing the output of flip-flop 222 with respect to instance 354 at which node C transitions to logic '1'. The combination delay may be caused by the combinational blocks such as inverter 252 and AND gate 254.

At 356: At the next rising edge of CLK2 (e.g., at instance 356), the logic value of node C (e.g., logic '1') is sampled at the output of flip-flop 242 (node R). For instance, the logic level of node R is shown as switching to logic '1', at instance 356. As a result, output of second pulse generation circuit 240 (Dout) transitions to a logic '0' state from a logic '1' state at instance 310, as the inverted output of node R (e.g., logic '0') causes the output of the AND gate to attain the logic '0'. In this manner, an active high signal of the source data pulse (at node B, between instances 302 to 304) is transferred from the source clock domain as the active high pulse of the destination data pulse (at Dout, between instances 354 to 356) to the destination clock domain. Further, at instance 310, the signal at node P (logic '0') is also propagated at the output of flip-flop 232 (node Q) causing the logic level of node Q to attain logic '0'.

At 358 and onwards: At the rising edge of CLK2 (at instance 358), the output of flip-flop 232 (that is input to flip-flop 234) is sampled at the output of flip-flop 234. As a result, node C switches from logic '1' to logic '0'. As such, node C transitions to logic '0' at the rising edge of CLK2 (at instance 358) by sampling the last value of node Q (e.g., logic '0'), and node R follows the logic level of node C at the next rising edge of CLK2 (e.g., at instance 360), so that next source data signal may be transferred as the destination data pulse in the destination clock domain.

In an exemplary timing diagram 300 shown in FIG. 3, the source data pulse is transferred in the destination clock domain in a single clock cycle of the source clock and two clock cycles of the destination clock. However, in a critical case (e.g., the worst case), the maximum time difference between the transfer of the source data pulse from the source clock domain to the destination clock domain may be a sum of a single clock cycle and two clock cycles of the destination clock.

FIG. 4 is a timing diagram 400 illustrating signals at various nodes of the circuit 200, when the source clock domain operates with a slow clock frequency signal and the destination clock domain operates with a fast clock frequency signal.

For instance, CLK1 has a lower operating frequency than that of CLK2, as shown in the timing diagram 400.

At 402 and 404: At rising edges of CLK1 (see, 402 and 404) source data signal (DIN) is converted into a source data pulse at node B. As a result, the active high logic level of the source input pulse is sampled at the output of flip-flop 222 (node P). For instance, as shown in timing diagram 400, node P transitions to a logic '1', at instance 404. Since, signal at node P is also feedback to node A via OR gate 224, which in turn, maintains the logic level '1' at node P, unless the CLRZ input of flip-flop 222 is asserted.

At 452: At a rising edge of CLK2 (e.g., instance 452), the logic level of node P (e.g., logic '1') is sampled at the output of flip-flop 232 (see, node Q).

At 454: At the next rising edge of CLK2 (e.g., instance 454), the value of node Q (e.g. logic '1') is sampled at the output of flip-flop 234 (see, node C). At the instance 454, the output of second pulse generation circuit 240 (see, Dout) transitions to logic '1'. As node C switches to logic '1', clear input (CLRZ) is asserted, causing the output of flip-flop 222 to attain logic '0', as represented by reference numeral 406 in the timing diagram 400.

At 456 and onwards: At the next rising edge of CLK2 (e.g., instance 456), node Q transitions to logic '0', as it follows the logic '0' of node P. At the same instance, the output of flip-flop 242 (see, node R) also switches to logic '1', causing the output of second pulse generation circuit 240 to achieve logic '0'. In this manner, the destination data pulse (at node Dout) is generated in the destination clock domain. For instance, an active high signal of the source data pulse (at node B, between instances 402 to 404) is transferred from the source clock domain as the active high pulse of the destination data pulse (at node B, between instances 454 to 456) to the destination clock domain. Further, at the next rising edge of CLK2, (see, instance 458), node C transitions to logic '0', and node R also follows the same at the next rising edge of CLK2 (not shown), so that a destination data pulse for the next source data signal may be generated.

Accordingly, various embodiments of the present technology provide circuits that can be used for the transfer of signals between the source clock domain and the destination clock domain irrespective of the clock frequencies of the either domain and any phase difference. For instance, circuit 200, and other variants of circuit 200, may be utilized for transferring signals from a fast clock domain to a slow clock domain, or vice versa. Further, the timing path from an output of flip-flop 234 to CLRZ (clear input) of flip-flop 222 is an asynchronous path and does not need to meet timing requirements. For instance, when CLRZ of flip-flop 222 is asserted, the source data pulse is already captured by flip-flop 232 of clocked synchronizer circuit 230, so any metastability condition at the output of flip-flop 222 does not affect the captured source data pulse by the flip-flop 232. Also, when CLRZ of flip-flop 222 is de-asserted, the D input of flip-flop 222 remains at its earlier state value of logic '0', so the timing violation on CLRZ (if it occurs) does not lead to metastability on the output of flip-flop 222.

Figure 5:
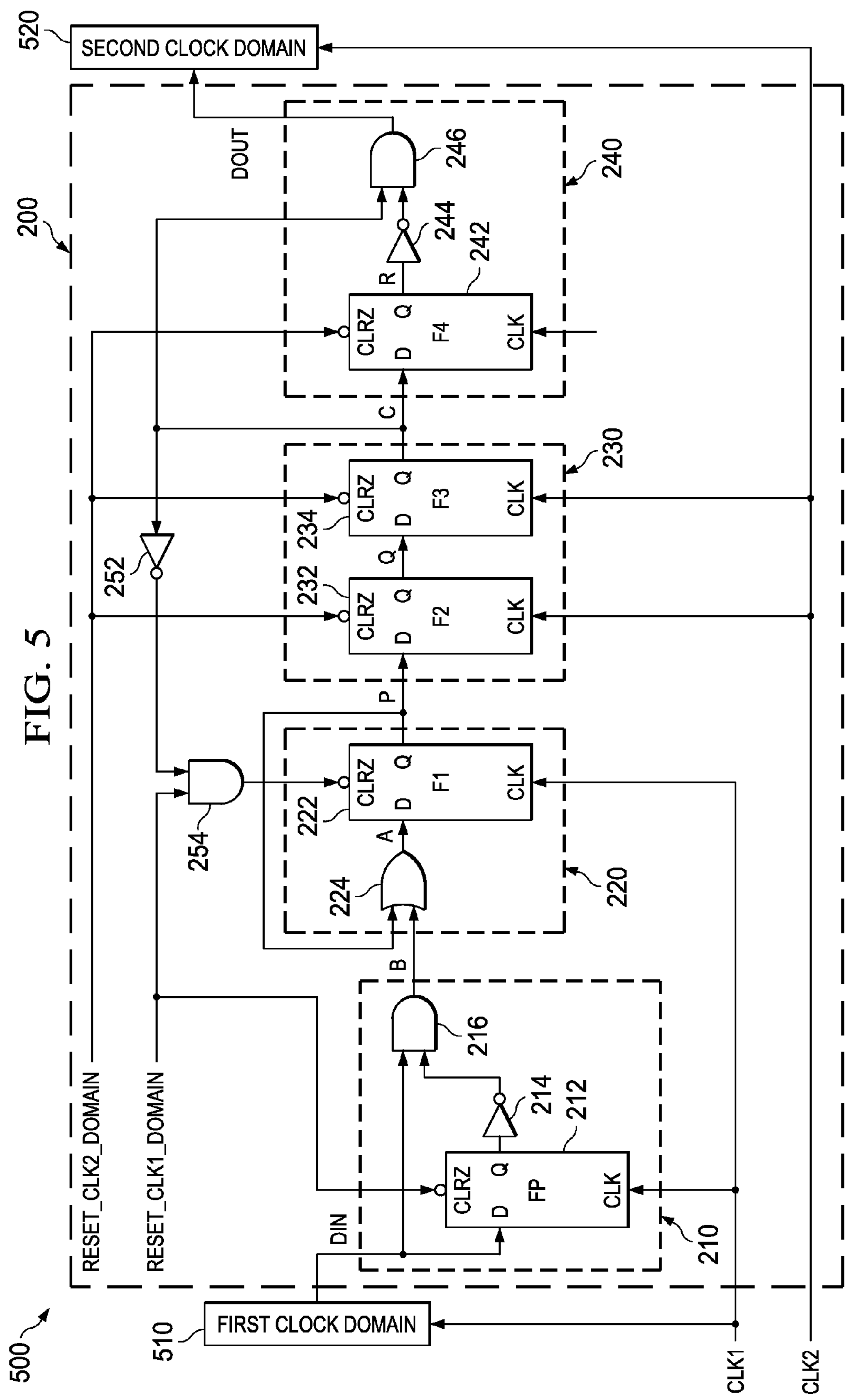
FIG. 5 is a schematic circuit diagram of an integrated circuit according to an embodiment.

Referring now to FIG. 5, a schematic diagram of an integrated circuit 500 is shown according to an embodiment. The integrated circuit (IC) 500 includes different clock domains such as a first clock domain 510 and a second clock domain 520. The first clock domain may include any digital or mixed signal circuit operating on a first clock (see, CLK1). The second clock domain may be any digital or mixed signal circuit operating on a second clock (see, CLK2). The first clock and the second clock are different frequencies. IC 500 includes a signal transfer circuit such as signal transfer circuit 200 that is coupled between first clock domain 510 and second clock domain 520. Signal transfer circuit 200 receives a signal from first clock domain 510 (see, Din) and transfers the signal to the second clock domain from outputs of signal transfer circuit 200 (see, Dout).

Figure 6:
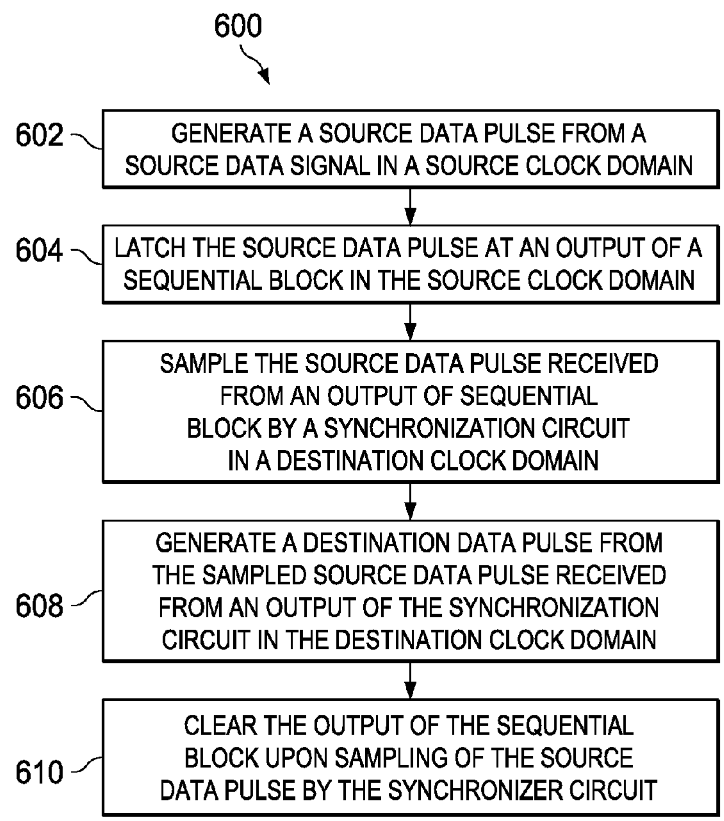
FIG. 6 is a flow diagram of a method for transferring signals from a source clock domain to a destination clock domain according to an embodiment.

FIG. 6 is a flow diagram of a method 600 for transferring signals between a source clock domain and a destination clock domain in accordance with an embodiment. Method 600 includes generating a source data pulse, latching the source data pulse at an output of a sequential block in the source clock domain and sampling the latched source data pulse in the destination clock domain. Method 600 also includes clearing the output of the flip-flop circuit once the source data pulse is sampled in the destination clock domain, and generating a destination data pulse from the sampled source data pulse in the destination clock domain. Operations of method 600 may be performed by a signal transfer circuit (see, FIG. 2).

At 602, method 600 includes generating a source data pulse from a source data signal in a source clock domain. The source data pulse may be generated by performing logical AND operation of an inverted output of a sequential element and one of the source data signal and the inverted source data signal. The sequential element is configured to operate with a source clock of the source clock domain and is configured to receive one of the source data signal and an inverted source data signal. The source data pulse is generated as an active high pulse. As such, if the source data signal is the active high signal, the logical AND operation is performed of the source data signal and the inverted output of the sequential element, where the sequential element is configured to receive the source data signal. Further, if the source data signal is the active low signal, the logical AND operation is performed of an inverted source data signal and the inverted output of the sequential element, where the sequential element is configured to receive the inverted source data signal.

At 604, method 600 includes latching the source data pulse at an output of a sequential block in the source clock domain (see, FIG. 2). The sequential block may be an example of hold flip-flop circuit 222 of FIG. 2.

At 606, method 600 includes sampling the output of sequential block by a synchronizer circuit in a destination clock domain. The synchronizer circuit may be an example of clocked synchronizer circuit 230 of FIG. 2. For instance, sampling the output of the sequential block comprises sampling, by a first flip-flop, the output of the sequential block in the destination clock domain, and sampling, by a second flip-flop, an output of the first flip-flop in the destination clock domain for synchronizing the source data pulse with respect to the destination clock. An example of the first flip-flop may be flip-flop 232, and an example of the second flip-flop may be flip-flop 234.

At 608, method 600 includes generating a destination data pulse from an output of the synchronizer circuit in the destination clock domain, and at 610, method 500 includes clearing of the latched output of the sequential block upon sampling the latched output of the sequential block by the synchronizer circuit in the destination clock domain. It should be noted that in certain embodiments, operations 608 and 610 may be performed at a same instant, for example at a same rising edge of destination clock.

In some embodiments, an output of the sequential block is cleared when the output of the second flip-flop transitions to an active high state. In certain embodiments, the destination data pulse may be generated by performing a logical AND operation of an inverted output of a sequential element and an output of the synchronizer circuit, wherein the sequential element is configured to receive the output of the synchronizer circuit as data input. As also explained in conjunction with FIG. 2, the destination data pulse is an output of the AND gate when the source data signal is an active high signal, and wherein the destination data pulse is an inverted output of the AND gate when the source data signal is an active low signal.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions are apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A circuit for transferring signals from a source clock domain to a destination clock domain, the circuit comprising:

a first pulse generation circuit, actually and positively operating in the source clock domain, configured to generate a source data pulse from a source data signal;

a hold flip-flop circuit, actually and positively operating in the source clock domain, configured to hold the source data pulse received from the first pulse generation circuit at an output of the hold flip-flop circuit;

a clocked synchronizer circuit, actually and positively operating in the destination clock domain, configured to sample the source data pulse received from the output of the hold flip-flop circuit, wherein the source data pulse held at the output of the hold flip-flop circuit is configured to be clear when the source data pulse is sampled at an output of the clocked synchronizer circuit; and a second pulse generation circuit, actually and positively operating in the destination clock domain and coupled with the clocked synchronizer circuit, configured to generate a destination data pulse in response to the sampled source data pulse received from the output of the clocked synchronizer circuit.

2. The circuit of claim 1, wherein the first pulse generation circuit comprises:

a sequential element configured to operate with a source clock of the source clock domain, the sequential element configured to receive one of the source data signal and an inverted source data signal; and an AND gate configured to perform logical AND operation of an inverted output of the sequential element and one of the source data signal and the inverted source data signal to generate the source data pulse.

3. The circuit of claim 2, wherein each of the sequential element and the AND gate receives the source data signal when the source data signal is an active high signal, and wherein each of the sequential element and the AND gate receives the inverted source data signal when the source data signal is an active low signal.

4. The circuit of claim 2, wherein the sequential element is a D flip-flop having a clock input connected to the source clock and configured to be reset in the source clock domain.

5. The circuit of claim 1, wherein the hold flip-flop circuit comprises:

a hold flip-flop configured to operate with a source clock of the source clock domain; and an OR gate configured to perform logical ORing of an output of the hold flip-flop and the source data pulse, wherein an output of the OR gate is coupled with a data input of the hold flip-flop, and wherein the hold flip-flop has a clear input connected to the output of the clocked synchronizer circuit.

6. The circuit of claim 5, wherein the hold flip-flop is a D flip-flop, wherein the D flip-flop has a clock input connected to the source clock and configured to be reset in the source clock domain.

7. The circuit of claim 1, wherein the clocked synchronizer circuit comprises:

a first flip-flop configured to operate with a destination clock of the destination clock domain and receive the output of the hold flip-flop circuit; and a second flip-flop configured to operate with the destination clock, the second flip-flop receiving an output of the first flip-flop for synchronizing the output of the hold flip-flop circuit with respect to the destination clock.

8. The circuit of claim 7, wherein output of the hold flip-flop circuit is configured to be clear when the output of the second flip-flop transitions to an active high state.

9. The circuit of claim 1, wherein the second pulse generation circuit comprises:

a sequential element operating with a destination clock of the destination clock domain, the sequential element receiving the output of the clocked synchronizer circuit; and an AND gate receiving an inverted output of the sequential element and the output of the clocked synchronizer circuit for generating the destination data pulse.

10. The circuit of claim 9, wherein the destination data pulse is an output of the AND gate when the source data signal is an active high signal, and wherein the destination data pulse is an inverted output of the AND gate when the source data signal is an active low signal.

11. A method for transferring signals from a source clock domain to a destination clock domain, the method comprising:

generating a source data pulse from a source data signal in the source clock domain;

latching the source data pulse at an output of a sequential block in the source clock domain;

sampling the source data pulse received from the output of the sequential block by a synchronizer circuit in the destination clock domain;

generating a destination data pulse from the sampled source data pulse received from the synchronizer circuit in the destination clock domain; and clearing the output of the sequential block upon sampling of the source data pulse by the synchronizer circuit.

12. The method of claim 11, wherein generating the source data pulse comprises:

performing logical AND operation of an inverted output of a sequential element and one of the source data signal and an inverted source data signal, wherein the sequential element is configured to operate with a source clock of the source clock domain and is configured to receive one of the source data signal and the inverted source data signal.

13. The method of claim 12, performing logical AND operation comprises one of:

performing logical AND operation of the source data signal and the inverted output of the sequential element when the source data signal is an active high signal, wherein the sequential element is configured to receive the source data signal; and performing logical AND operation of the inverted source data signal and the inverted output of the sequential element when the source data signal is an active low signal, wherein the sequential element is configured to receive the inverted source data signal.

14. The method of claim 11, wherein the sequential block comprises:

a hold flip-flop configured to operate with a source clock of the source clock domain; and an OR gate configured to perform logical ORing of the output of the hold flip-flop and the source data pulse, wherein an output of the OR gate is coupled with a data input of the hold flip-flop, and wherein the hold flip-flop has a clear input connected to an output of the synchronizer circuit.

15. The method of claim 11, wherein clearing the output of the sequential block comprises clearing the output when the output of the synchronizer circuit transitions to an active high state.

16. The method of claim 11, wherein generating the destination data pulse comprises:

performing logical AND operation of an inverted output of a sequential element and an output of the synchronizer circuit, wherein the sequential element is configured to receive the output of the synchronizer circuit, and wherein the destination data pulse is an output of the logical AND operation when the source data signal is an active high signal, and wherein the destination data pulse is an inverted output of the logical AND operation when the source data signal is an active low signal.

17. An integrated circuit comprising:

a first clock domain operating on a first clock;

a second clock domain operating on a second clock; and a signal transfer circuit coupled between the first clock domain and the second clock domain for transferring a source data signal from the first clock domain to the second clock domain, the signal transfer circuit comprising:

a first pulse generation circuit, operating on the first clock and coupled with the first clock domain, configured to generate a source data pulse from the source data signal received from the first clock domain;

a hold flip-flop circuit, operating on the first clock, configured to hold the source data pulse received from the first pulse generation circuit at an output of the hold flip-flop circuit;

a clocked synchronizer circuit, actually and positively operating in the second clock domain, configured to sample the source data pulse received from the output of the hold flip-flop circuit, wherein the source data pulse held at the output of the hold flip-flop circuit is configured to be clear when the source data pulse is sampled at an output of the clocked synchronizer circuit; and a second pulse generation circuit, operating on the second clock in the second clock domain and coupled with the clocked synchronizer circuit, configured to generate a destination data pulse in response to the sampled source data pulse received from the output of the clocked synchronizer circuit.

18. The integrated circuit of claim 17, wherein the first pulse generation circuit comprises:

a sequential element configured to operate with the first clock of the first clock domain, the sequential element configured to receive one of the source data signal and an inverted source data signal; and an AND gate configured to perform logical AND operation of an inverted output of the sequential element and one of the source data signal and the inverted source data signal to generate the source data pulse.

19. The integrated circuit of claim 18, wherein each of the sequential element and the AND gate receives the source data signal when the source data signal is an active high signal, and wherein each of the sequential element and the AND gate receives the inverted source data signal when the source data signal is an active low signal.

20. The integrated circuit of claim 19, wherein the second pulse generation circuit comprises:

a sequential element operating with the second clock of the second clock domain, the sequential element receiving the output of the clocked synchronizer circuit; and an AND gate receiving an inverted output of the sequential element and the output of the clocked synchronizer circuit for generating the destination data pulse, wherein the destination data pulse is an output of the AND gate when the source data signal is an active high signal, and wherein the destination data pulse is an inverted output of the AND gate when the source data signal is an active low signal.

* * * * *